United States Patent Office 3,121,768
Patented Feb. 18, 1964

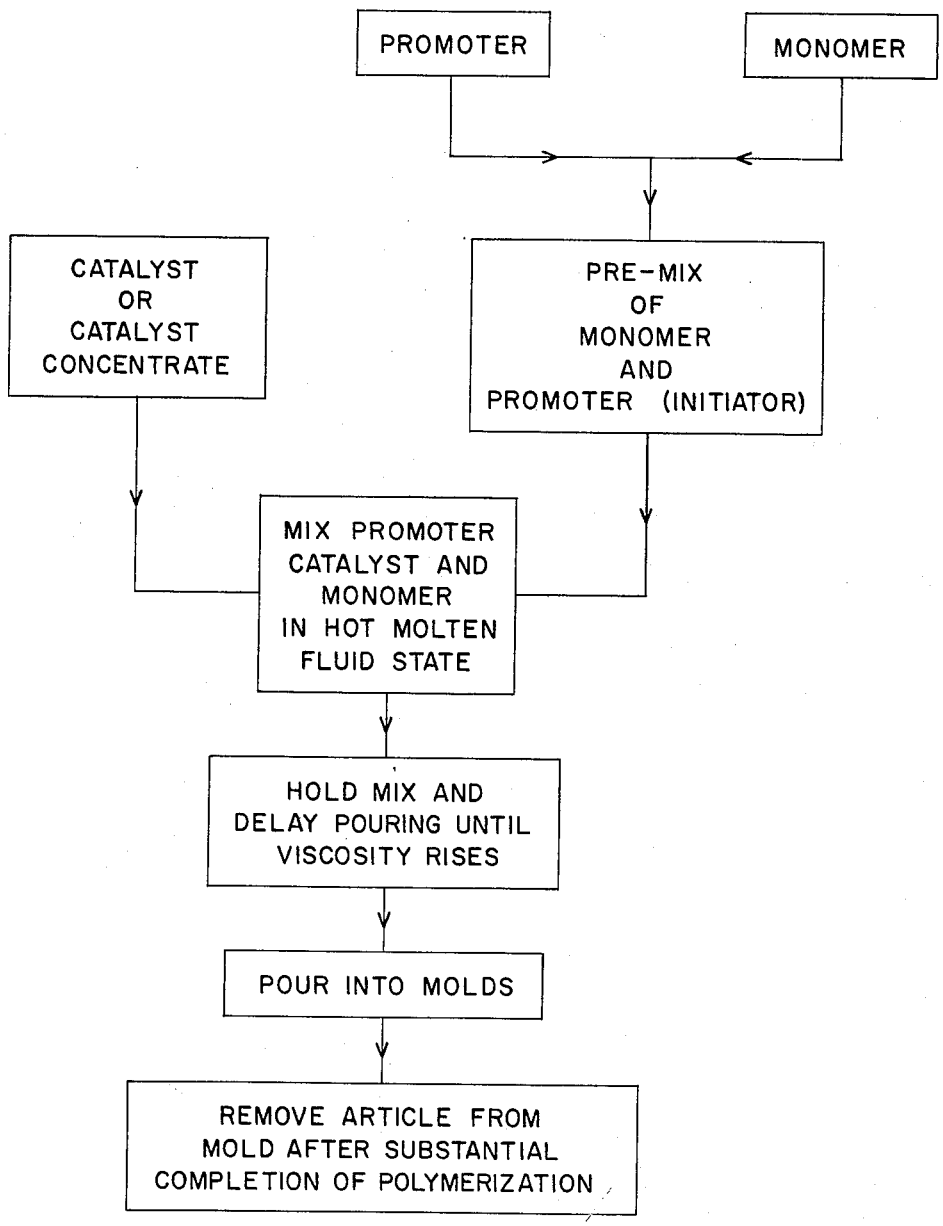

3,121,768
METHOD OF CASTING
Richard W. Boyer, West Lawn, Pa., assignor to Polymer Processes, Inc., a corporation of Pennsylvania
Filed Sept. 27, 1962, Ser. No. 226,688
10 Claims. (Cl. 264—331)

This invention relates to a method of making shaped polylactam articles. More particularly, this invention relates to a method of casting shaped polylactam articles by a casting procedure which includes a delayed pouring step and low temperature anionic polymerization of higher lactams.

In "low temperature" polymerization of higher lactams, lactam monomer can be polymerized to a polylactam, if desired, by carrying out the polymerization process above the melting point of the monomer but below the melting point of the polymer. In this type of polymerization articles can be cast simultaneously with the polymerization.

The low temperature anionic polymerization of lactams referred to above is disclosed, for example, in U.S. Patents 3,015,652; 3,017,391; 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula $$\underset{R}{A-N-B}$$

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly acid anhydrides generate organic acids in the system which then require sufficient anionic catalyst to neutralize the organic acid in addition to the amount desired to function in the polymerization reactions.

In typical prior art procedures for low temperature polymerization of higher lactams, the polymer precursor ingredients are mixed, brought up to a proper initiation temperature, and then poured into a mold without particular regard to the viscosity of the castable mix. It has been found, however, that the viscosity of the casting material is important and that articles with improved surface characteristics and more uniform structure can be produced, if the mix has sufficient body or the viscosity is of a sufficient magnitude prior to pouring.

It is an object of this invention to provide a method of casting a polylactam article having a surface which is smooth and substantially free of bubbles and voids.

Another object of this invention is to minimize scrap and wastage by producing a shaped cast polylactam article with improved surface characteristics as removed from the mold which thus requires only a minimum of machining and finishing operations.

It is a further object of this invention to cast a polylactam article having a more uniform structure throughout its cross section and particularly in the layers lying adjacent to and immediately beneath the surface.

Other objects will appear from the description given hereinafter.

Briefly, the objects of this invention are achieved by pouring the promoted (initiated) and catalyzed monomer into a suitable mold after it has passed through an incipient polymer formation stage and reached a slight to moderate viscous state, but before it reaches a magnitude of viscosity which precludes pouring and filling of the mold cavity or cavities. Stated otherwise, by commencing the polymerization process prior to the pouring of the castable mix, i.e., the initiated and catalyzed monomer, and carrying out incipient polymer formation in a mixing or holding vessel remote from the mold rather than in the mold, the objects of the present invention are achieved.

FIG. 1 is a simplified flow sheet or diagrammatic representation outlining one arrangement or succession of steps that may be employed in practicing the invention.

In the following examples, various types of molds and mold materials are mentioned. However, the invention is not limited to any particular type of mold or mold material since it is understood that many different types of molds may be used, e.g., open molds, split molds,

3 cored molds, single or multiple cavity molds, etc., as well as different mold materials, e.g., aluminum, steel, cast iron, glass, etc.

*Example 1*

A batch of promoted monomer was prepared by adding tolylene diisocyanate promoter (initiator) to epsilon-caprolactam monomer in the proportion of 1/200 of a mole of promoter to one mole of monomer. The temperature of this mixture was then raised to 160° C. At this point sodium hydride catalyst was added in the proportion of 1/320 of a mole per one mole of monomer. The batch of catalyzed and initiated monomer was held in the mixing vessel until the viscosity increased appreciably;* it was then poured into a multiple cavity, aluminum mold, preheated to about 350° F., to form shaped drive bushings. After polymerization was substantially completed, the bushings were removed from the mold and allowed to cool to room temperature. The bushings were examined and found to have excellent surface characteristics, as evidenced by a very smooth surface, lack of bubbles and voids. The pieces required no machining or finishing treatment.

*Example 2*

Example 1 was repeated using the same materials and conditions except that no delay or holdup in pouring was used after raising the temperature of the promoted monomer to 160° C. and adding catalyst thereto. Pouring in this manner, i.e., pouring immediately after adding catalyst and before any appreciable rise in viscosity occurred resulted in parts having poor surface characteristics, e.g., bubbles, voids, uneven surface, etc. Parts made in this example were not as dimensionally accurate or uniform in structure as those made by the procedure of Example 1. It was necessary to fairly extensively machine these parts.

*Example 3*

A batch of promoted monomer was prepared by adding tolylene diisocyanate promoter to epsilon-caprolactam monomer in the proportion of 1/200 of a mole of promoter to one mole of monomer. The temperature of this mixture was then raised to 140° C. At this point sodium hydride catalyst was added in the proportion of 5/1600 of a mole per one mole of monomer. The batch of catalyzed and initiated monomer was held in the mixing vessel until the viscosity increased appreciably;* it was then poured into an aluminum sheet metal mold, preheated to about 350° F. to form shaped gear facings. After polymerization was substantially completed, the gear facings were removed from the mold and allowed to cool to room temperature. The gear facings were examined and found to have excellent surface characteristics. No bubbles or voids were present and the piece required no machining.

*Example 4*

Example 3 was repeated using the same materials and conditions except that no delay or holdup in pouring was resorted to after raising the temperature of the promoted monomer to 140° C. and adding catalyst thereto. Pouring in this manner, i.e., pouring immediately after adding catalyst and before any appreciable rise in viscosity occurred, resulted in rejected parts because of poor surface characteristics, e.g., bubbles, voids, uneven surface. Also, parts made using the procedure of this example were not as dimensionally accurate or uniform in structure as those made by the procedure of Example 3.

*Example 5*

A batch of casting material was prepared by adding 1/200 of a mole tolylene diisocyanate promoter and sodium hydride catalyst to hot molten caprolactam monomer at 155° C. Pouring of the casting was delayed until the viscosity increased appreciably.* A ceramic alumina mold was used to produce a shaped cylindrical article, which after removal from the mold and cooling, had good surface finish characteristics.

With further reference to viscosity rise or increase and the asterisks given in Examples 1, 3 and 5, it has been noted that such viscosity increase and initial or incipient polymer formation is accompanied by a corresponding rise in temperature due to exothermic reaction. In Examples 1, 3 and 5, as well as in other cases, the temperature rise corresponding to appreciably viscosity rise amounted to a minimum of about 3–5° C., as measured under essentially adiabatic conditions. Accordingly, the viscosity increase with which this invention is concerned may be expressed as that viscosity increase which would occur by holding or delaying the pouring of the castable mix, after heating thereof to a given initiation temperature, until the temperature of the castable mix has risen above the initiation temperature by at least 3 to 5° C., as measured under essentially adiabatic conditions. The time required for this temperature rise to occur will vary somewhat with the catalyst and promoter concentration as well as with the initiation temperature selected.

It is understood that the shaped polylactam articles made by the method of the present invention may contain fillers, pigments, dyes, plasticizers, etc. For uniform distribution throughout the polymer, such additives may be incorporated in the monomer prior to pouring and polymerization thereof.

As will be apparent to those skilled in the art, many modifications, changes and alterations are possible without departing from the spirit and scope of this invention.

What is claimed is:

1. The method of forming a shaped article from a higher monomeric lactam by anionic polymerization of the lactam which comprises preparing a castable and polymerizable mix comprising said lactam, a promoter compound and a catalyst, heating the mix to an initiation temperature sufficient to initiate polymerization, delaying the pouring of said mix until the viscosity has risen appreciably, which viscosity rise is accompanied by a corresponding characteristic rise in temperature and then pouring said mix into a mold to carry out and substantially complete polymerization of said lactam to form said shaped article.

2. The method of claim 1 wherein the higher lactam is epsilon-caprolactam.

3. The method of forming a shaped article from a higher monomeric lactam by anionic polymerization of the lactam which comprises preparing a castable and polymerizable mix comprising said lactam, a promoter compound and a catalyst, heating the mix to an initiation temperature sufficient to initiation polymerization, and then filling a mold with said castable and polymerizable mix only after the viscosity thereof has risen appreciably, which viscosity rise is accompanied by a temperature rise of at least about 3 to 5° C., as measured under essentially adiabatic conditions, whereby polymerization of said lactam is substantially completed and said shaped article is formed.

4. The method of claim 3 in which the higher lactam is epsilon-caprolactam.

5. The method of claim 4 in which the promoter compound is tolylene diisocyanate and the catalyst is sodium caprolactam.

6. The method of claim 4 wherein the mold is preheated.

7. The method of claim 4 in which the mold is made of metal.

8. The method of claim 4 wherein the mold is a ceramic mold.

9. The method of forming shaped articles from a higher monomeric lactam by anionic polymerization of the lactam which comprises preparing a castable and polymerizable mix comprising said lactam, a promoter compound and a catalyst, heating the mix to an initiation temperature sufficient to initiate polymerization, and then pouring said castable and polymerizable mix into a mold only after the viscosity thereof has risen appreciably, which viscosity rise is accompanied by a temperature rise of at least about 3–5° C., as measured under essentially adiabatic conditions, whereby said shaped article is formed.

10. The method of claim 9 in which the higher lactam is epsilon-caprolactam.

References Cited in the file of this patent

UNITED STATES PATENTS

| | | |
|---|---|---|
| 2,993,233 | Hoppe et al. | July 25, 1961 |
| 3,013,305 | Gooreyard | Dec. 19, 1961 |
| 3,018,273 | Butler et al. | Jan. 23, 1962 |